(12) United States Patent
Buer et al.

(10) Patent No.: US 8,000,469 B2
(45) Date of Patent: *Aug. 16, 2011

(54) AUTHENTICATION ENGINE ARCHITECTURE AND METHOD

(75) Inventors: Mark Buer, Gilbert, AZ (US); Patrick Y. Law, Milpitas, CA (US); Zheng Qi, Milpitas, CA (US)

(73) Assignee: Broadcom Corporation, Irvine, CA (US)

( * ) Notice: Subject to any disclaimer, the term of this patent is extended or adjusted under 35 U.S.C. 154(b) by 807 days.

This patent is subject to a terminal disclaimer.

(21) Appl. No.: 11/650,422

(22) Filed: Jan. 8, 2007

(65) Prior Publication Data

US 2007/0110230 A1    May 17, 2007

Related U.S. Application Data

(63) Continuation of application No. 09/827,882, filed on Apr. 4, 2001, now Pat. No. 7,177,421.

(60) Provisional application No. 60/261,425, filed on Jan. 12, 2001, provisional application No. 60/197,152, filed on Apr. 13, 2000.

(51) Int. Cl.
*H04L 9/00*   (2006.01)
(52) U.S. Cl. ............. 380/29; 380/30; 708/252; 711/109
(58) Field of Classification Search .................... 380/29, 380/30, 265; 708/252; 365/78; 711/109
See application file for complete search history.

(56) References Cited

U.S. PATENT DOCUMENTS 4,041,292 A    8/1977   Kindell
4,754,422 A    6/1988   Sakai et al.
(Continued)

FOREIGN PATENT DOCUMENTS

WO    WO 01/80483 A2    10/2001

OTHER PUBLICATIONS

Sait, S.M., et al., "A Novel Technique for Fast Multiplication," Computers and Communications, Conference Proceedings of the 1995 IEEE Fourteenth Annual International Phoenix Conference on Mar. 28-31, 1995, pp. 109-114.

(Continued)

*Primary Examiner* — Michael Pyzocha
*Assistant Examiner* — Paul Callahan
(74) *Attorney, Agent, or Firm* — Sterne, Kessler, Goldstein & Fox PLLC

(57) ABSTRACT

Provided is an architecture (hardware implementation) for an authentication engine to increase the speed at which multi-loop and/or multi-round authentication algorithms may be performed on data packets transmitted over a computer network. Authentication engines in accordance with the present invention apply a variety of techniques that may include, in various applications, collapsing two multi-round authentication algorithm (e.g., SHA1 or MD5 or variants) processing rounds into one; reducing operational overhead by scheduling the additions required by a multi-round authentication algorithm in such a matter as to reduce the overall critical timing path ("hiding the ads"); and, for a multi-loop (e.g., HMAC) variant of a multi-round authentication algorithm, pipelining the inner and outer loops. In one particular example of applying the invention in an authentication engine using the HMAC-SHA1 algorithm of the IPSec protocol, collapsing of the conventional 80 SHA1 rounds into 40 rounds, hiding the ads, and pipelining the inner and outer loops allows HMAC-SHA1 to be conducted in approximately the same time as conventional SHA1.

19 Claims, 6 Drawing Sheets

U.S. PATENT DOCUMENTS

| | | | |
|---|---|---|---|
| 4,801,935 | A | 1/1989 | Cairns |
| 5,297,206 | A | 3/1994 | Orton |
| 5,299,319 | A | 3/1994 | Vassiliadis et al. |
| 5,548,544 | A | 8/1996 | Matheny et al. |
| 5,796,836 | A | 8/1998 | Markham |
| 5,870,474 | A | 2/1999 | Wasilewski et al. |
| 5,936,967 | A | 8/1999 | Baldwin et al. |
| 5,940,877 | A | 8/1999 | Eickemeyer et al. |
| 5,943,338 | A | 8/1999 | Duclose et al. |
| 6,111,858 | A | 8/2000 | Greaves et al. |
| 6,216,167 | B1 | 4/2001 | Momirov |
| 6,304,657 | B1 | 10/2001 | Yokata et al. |
| 6,334,190 | B1 | 12/2001 | Silverbrook et al. |
| 7,177,421 | B2 * | 2/2007 | Buer et al. ............ 380/28 |
| 2001/0021253 | A1 | 9/2001 | Furuya et al. |

OTHER PUBLICATIONS

Hao-Yung Lo, et al., "A High-Speed Self-Timing Carry-Completion for Direct Two's Complement Multipliers," Circuits and Systems IEEE APCCAS 1998, The 1998 IEEE Asia-Pacific Conference on Nov. 24-27, 1998, pp. 643-646.

Ragab, A., et al., "An Efficient Message Digest Algorithm (MD) for Data Security," Electrical and Electronic Technology, TENCON, Proceedings of IEEE Region 10 International Conference on vol. 1, Aug. 19-22, 2001, pp. 191-197.

Deepakumara, J., et al, "FPGA Implementation of MD5 Hash Algorithm," Electrical and Computer Engineering, 2001, Canadian Conference on May 13-16, 2001, vol. 2, pp. 919-924.

International Search Report for Application No. PCT/US02/00642, Search completed on Oct. 17, 2002, The Netherlands.

Sedgewick, R., "Algorithms in C—Third Edition," 1998, Addison Wesley, XP002163543, pp. 573-608.

"Secure Products VMS15," VLSI Technology, Inc., Printed in USA, Document Control: VMS115, VI, 0, Jan. 1999, pp. 1-2.

"VMS115 Data Sheet," VLSI Technology, Inc., a subsidiary of Philips Semiconductors, Revision 2:3, Aug. 10, 1999, pp. 1-64.

"Data Sheet 7751 Encryption Processor," Network Security Processors, Jun. 1999, pp. 1-84.

Senie, D., "NAT Friendly Application Design Guidelines," Amaranth Networks, Inc., NAT Working Group, Internet—Draft, Sep. 1999, pp. 1-7.

Floyd, Sally, et al., "Random Early Detection Gateways for Congestion Avoidance," Lawrence Berkeley Laboratory, University of California, IEEE/ACM Transactions on Networking, Aug. 1993, pp. 1-32.

Egevang, K., et al, "The IP Network Address Translator (NAT)," Network Working Group, May 1994, pp. 1-10.

Pall, G.S., et al., "Microsoft Point-To-Point Encryption (MPPE) Protocol," Microsoft Corporation, Network Working Group, Internet Draft, Oct. 1999, pp. 1-12.

Deutsch, P., "DEFLATE Compressed Data Format Specification Version 1.3," Aladdin Enterprises, Network Working Group, May 1996, pp. 1-17.

Kent, S., "IP Authentication Header," Network Working Group, Nov. 1998, pp. 1-22.

Kent, S. et al., "IP Encapsulating Security Payload (SP)," Network Working Group, Nov. 1998, pp. 1-22.

Maughan, D. et al., "Internet Security Association and Key Management Protocol (ISAKMP)," Network Working Group, Nov. 1998, pp. 1-20.

Harkins, D., et al, "The Internet Key Exchange (IKE)," Cisco Systems, Network Working Group, Nov. 1998, pp. 1-12.

Srisuresh, P., "Security Model with Tunnel-mode Ipsec for NAT Domains," Lucent Technologies, Network Working Group, Oct. 1999, pp. 1-11.

Shenker, S., "Specification of Guaranteed Quality of Service," Network Working Group, Sep. 1997, pp. 1-20.

Srisuresh, P. et al., "IP Network Address Translator (NAT) Terminology and Considerations," Lucent Technologies, Network Working Group, Aug. 1999 pp. 1-30.

Kent, S. et al., "Security Architecture for the Internet Protocol," Network Working Group, Nov. 1998, pp. 1-66.

"Compression for Broadband Data Communications," BlueSteel Networks, Inc., Sep. 8, 1999, pp. 1-9.

"Securing and Accelerating e-Commerce Transactions," BlueSteel Networks, Inc., Revision 2.0, Oct. 20, 1999, pp. 1-7.

"Securing Broadband Communications," BlueSteel Networks, Inc., Sep. 8, 1999, pp. 1-10.

Analog Devices: "ADSP2141 SafeNetDPS User's Manual, Revision 6," Analog Devices Technical Specifications, Mar. 2000, XP002163401, 87 pages.

C. Madson, R. Glenn: "RFC 2403—The Use of HMAS-MD5-96 within ESP and AH," IETF Request for Comments, Nov. 1998, XP002163402, Retrieved from Internet on Mar. 20, 2001, http://www.faqs.org/rfcs/frc2403.html, 5 pages.

S. Kent, R. Atkinson: "RFC 2406-IP Encapsulating Security Payload (ESP)," IETF Request for Comments, Nov. 1998, XP002163400, Retrieved from the Internet on Mar. 20, 2001, http://www.faqs.org/rfcs/frc2406.html, 5 pages.

Keromytis, et al., "Implementing IPsec," Global Telecommunications Conference (Globecom), IEEE, Nov. 3, 1997, pp. 1948-1952.

Pierson, et al., "Context-Agile Encryption for High Speed Communication Networks," Computer Communications Review, Association for Computing Machinery, vol. 29, No. 1, Jan. 1999, pp. 35-49.

Sholander, et al, "The Effect of Algorithm-Agile Encryption on ATM Quality of Service," Global Telecommunications Conference (Globecom), IEEE, Nov. 3, 1997, pp. 470-474.

Smirni, et al., "Evaluation of Multiprocessor Allocation Policies," Technical Report, Vanderbilt University, Online, 1993, pp. 1-21.

Tarman, et al., "Algorithm-Agile Encryption in ATM Networks," IEEE Computer, Sep. 1998, vol. 31, No. 1, pp. 57-64.

Wassal, et al., "A VLSI Architecture for ATM Algorithm-Agile Encryption," Proceedings Ninth Great Lakes Symposium on VLSI, Mar. 4-6, 1999, pp. 325-328.

Analog Devices: "Analog Devices and IRE Announce First DSP-Based Internet Security System-On-A-Chip," Analog Devices Press Release, Online, Jan. 19, 1999, pp. 1-3. http://content.analog.com/pressrelease/prdisplay/0,1622,16,00.html.

3Com: "3Com Launches New Era of Network Connectivity," 3Com Press Release, Jun. 14, 1999, pp. 1-3.

Schneier, B., "Applied Cryptography, Second Edition," 1996, John Wiley & Sons, New York, pp. 436-445.

Touch, Joseph D., "Performance Analysis of MD5", Computer Communications Review, Association for Computing Machinery, New York, vol. 25, No. 44, Oct. 1, 1995, pp. 77-86.

Bellare, et al., "Message Authentication Using Hash Functions—The HMAC Construction," vol. 2, No. 1, 1996, pp. 1-5.

Stallings, w., "SHA: The Secure Wash Algorithm Putting Message Digests to Work," Dr. Dobbs Journal, Redwood City, CA, US, Apr. 1, 1994, p. 32 and 34.

Yong, Kyu Kang et al., "An Efficient Implementation of Hash Function Processor for IPSEC," ACM 2000, pp. 1-4.

* cited by examiner

AUTHENTICATION ENGINE ARCHITECTURE AND METHOD

CROSS-REFERENCE TO RELATED APPLICATIONS

This application is a continuation of U.S. application Ser. No. 09/827,882, filed Apr. 4, 2001 now U.S. Pat. No. 7,177,421, which claims the benefit of U.S. Provisional Application No. 60/197,152, entitled Cryptography Processing Unit, filed Apr. 13, 2000; and U.S. Provisional Application No. 60/261,425, entitled Ubiquitous Broadband Security Chip, filed Jan. 12, 2001, all of which are herein incorporated herein by reference in its entireties.

BACKGROUND OF THE INVENTION

The present invention relates generally to the field of cryptography, and more specifically to an architecture and method for cryptography acceleration. In particular, the invention is directed to a hardware implementation to increase the speed at which authentication procedures may be performed on data packets transmitted over a computer network.

Many methods to perform cryptography are well known in the art and are discussed, for example, in *Applied Cryptography*, Bruce Schneier, John Wiley & Sons, Inc. (1996, $2^{nd}$ Edition), herein incorporated by reference. In order to improve the speed of cryptography processing, specialized cryptography accelerator chips have been developed. Cryptography accelerator chips may be included in routers or gateways, for example, in order to provide automatic IP packet encryption/decryption. By embedding cryptography functionality in network hardware, both system performance and data security are enhanced.

Cryptography protocols typically incorporate both encryption/decryption and authentication functionalities. Encryption/decryption relates to enciphering and deciphering data, authentication is concerned with data integrity, including confirming the identity of the transmitting party and ensuring that a data packet has not been tampered with en route to the recipient. It is known that by incorporating both encryption and authentication functionalities in a single accelerator chip, over-all system performance can be enhanced.

Examples of cryptography protocols which incorporate encryption/decryption and authentication functionalities include SSL (Netscape Communications Corporation), commonly used in electronic commerce transactions, and the more recently promulgated industry security standard known as "IPSec." These protocols and their associated algorithms are well known in the cryptography art and are described in detail in National Institute of Standards and Technology (NIST), IETF and other specifications, some of which are identified (for example, by IETF RFC#) below for convenience. These specifications are incorporated herein by reference for all purposes.

SSL (v3) uses a variant of HMAC (RFC2104) for authentication. The underlying hash algorithm can be either MD5 (RFC1321) and SHA1 (NIST). In addition, the key generation algorithm in SSL also relies on a sequence of MD5 and SHA1 operations. SSL deploys algorithms such as RC4, DES, triple DES for encryption/decryption operations.

The IP layer security standard protocol, IPSec (RFC2406) specifies two standard algorithms for performing authentication operations, HMAC-MD5-96 (RFC2403) and HMAC-SHA1-96 (RFC2404). These algorithms are based on the underlying MD5 and SHA1 algorithms, respectively. The goal of the authentication computation is to generate a unique digital representation, called a digest, for the input data.

Both MD5 and SHA1 specify that data is to be processed in 512-bit blocks. If the data in a packet to be processed is not of a multiple of 512 bits, padding is applied to round up the data length to a multiple of 512 bits. Thus, if a data packet that is received by a chip for an authentication is larger then 512 bits, the packet is broken into 512-bits data blocks for authentication processing. If the packet is not a multiple of 512 bits, the data left over following splitting of the packet into complete 512-bit blocks must be padded in order to reach the 512-bit block processing size. The same is true if a packet contains fewer then 512 bits of data. For reference, a typical Ethernet packet is up to 1,500 bytes. When such a packet gets split into 512-bit blocks, only the last block gets padded and so that overall a relatively small percentage of padding overhead is required. However for shorter packets, the padding overhead can be much higher. For example, if a packet has just over 512 bits it will need to be divided into two 512-bit blocks, the second of which is mostly padding so that padding overhead approaches 50% of the process data. The authentication of such short data packets is particularly burdensome and time consuming using the conventionally implemented MD5 and SHA1 authentication algorithms.

For each 512-bit data block, a set of operations including non-linear functions, shift functions and additions, called a "round," is applied to the block repeatedly. MD5 and SHA1 specify 64 rounds and 80 rounds, respectively, based on different non-linear and shift functions, as well as different operating sequences. In every round, the operation starts with certain hash states (referred to as "context") held by hash state registers (in hardware) or variables (in software), and ends with a new set of hash states (i.e., an initial "set" of hash states and an end set; a "set" may be of 4 or 5 for the number of registers used by MD5 and SHA1, respectively). MD5 and SHA1 each specify a set of constants as the initial hash states for the first 512-bit block. The following blocks use initial hash states resulting from additions of the initial hash states and the ending hash states of the previous blocks.

Typically, MD5 and SHA1 rounds are translated into clock cycles in hardware implementations. The addition of the hash states, to the extent that they cannot be performed in parallel with other round operations, requires overhead clock cycles in the whole computation. The computation of the padded portion of the data is also generally considered performance overhead because it is not part of the true data. Accordingly, the performance of MD5 and SHA1 degrade the most when the length of the padding is about the same as the length of the data (e.g., as described above, when a packet has just fewer than 512 bits of data and the padding logic requires an extra 512-bit to be added for holding the pad values).

Moreover, the HMAC-MD5-96 and HMAC-SHA1-96 algorithms used in IPSec expand MD5 and SHA1, respectively, by performing two loops of operations. The HMAC algorithm for either MD5 or SHA1 (HMAC-x algorithm) is depicted in FIG. 1. The inner hash (inner loop) and the outer hash (outer loop) use different initial hash states. The outer hash is used to compute a digest based on the result of the inner hash. Since the result of inner hash is 128 bits long for MD5 and 160 bits long for SHA1, the result must always be padded up to 512 bits and the outer hash only processes the one 512-bit block of data. HMAC-MD5-96 and HMAC-SHA1-96 provide a higher level of security, however additional time is needed to perform the outer hash operation. This additional time becomes significant when the length of the data to be processed is short, in which case, the time required to perform the outer hash operation is comparable to the time required to perform the inner hash operation.

Authentication represents a significant proportion of the time required to complete cryptography operations in the application of cryptography protocols incorporating both encryption/decryption and MD5 and/or SHA1 authentication functionalities. In the case of IPSec, authentication is often the time limiting step, particularly for the processing or short packets, and thus creates a data processing bottleneck. Accordingly, techniques to accelerate authentication and relieve this bottleneck would be desirable. Further, accelerated implementations of multi-round authentication algorithms would benefit any application of these authentication algorithms.

SUMMARY OF THE INVENTION

In general, the present invention provides an architecture (hardware implementation) for an authentication engine to increase the speed at which multi-loop and/or multi-round authentication algorithms may be performed on data packets transmitted over a computer network. As described in this application, the invention has particular application to the variants of the SHA1 and MD5 authentication algorithms specified by the IPSec cryptography standard. In accordance with the IPSec standard, the invention may be used in conjunction with data encryption/encryption architecture and protocols. However it is also suitable for use in conjunction with other non-IPSec cryptography algorithms, and for applications in which encryption/decryption is not conducted (in IPSec or not) and where it is purely authentication that is accelerated. Among other advantages, an authentication engine in accordance with the present invention provides improved performance with regard to the processing of short data packets.

Authentication engines in accordance with the present invention apply a variety of techniques that may include, in various applications, collapsing two multi-round authentication algorithm (e.g., SHA1 or MD5 or variants) processing rounds into one; reducing operational overhead by scheduling the additions required by a multi-round authentication algorithm in such a matter as to reduce the overall critical timing path ("hiding the adds"); and, for a multi-loop (e.g., HMAC) variant of a multi-round authentication algorithm, pipelining the inner and outer loops. In one particular example of applying the invention in an authentication engine using the HMAC-SHA1 algorithm of the IPSec protocol, collapsing of the conventional 80 SHA1 rounds into 40 rounds, hiding the adds, and pipelining the inner and outer loops allows HMAC-SHA1 to be conducted in approximately the same time as conventional SHA1.

In one aspect, the present invention pertains to an authentication engine architecture for an multi-loop, multi-round authentication algorithm. The architecture includes a first instantiation of a multi-round authentication algorithm hash round logic in an inner hash engine, and a second instantiation of a multi-round authentication algorithm hash round logic in an outer hash engine. A dual-frame payload data input buffer configured for loading one new data block while another data block one is being processed in the inner hash engine, an initial hash state input buffer configuration for loading initial hash states to the inner and outer hash engines for concurrent inner hash and outer hash operations, and a dual-ported ROM configured for concurrent constant lookups for both inner and outer hash engines are also included. The multi-loop, multi-round authentication algorithm may-be HMAC-MD5 or HMAC-SHA1.

In another aspect, the invention pertains to an authentication engine architecture for a multi-round authentication algorithm. The architecture includes a hash engine configured to implement hash round logic for a multi-round authentication algorithm. The hash round logic implementation included at least one addition module having a plurality of carry save adders for computation of partial products, and a carry look-ahead adder for computation and propagation of a final sum. The multi-round authentication algorithm may be MD5 or SHA1.

In another aspect, the invention pertains to an authentication engine architecture for an SHA1 authentication algorithm. The architecture includes at least one hash engine configured to implement hash round logic. The logic implementation includes five hash state registers, one critical and four non-critical data paths associated with the five registers. In successive SHA1 rounds, registers having the critical path are alternative.

In another aspect, the invention pertains to a method of authenticating data transmitted over a computer network. The method involves receiving a data packet stream, splitting the packet data stream into fixed-size data blocks, and processing the fixed-size data blocks using a multi-loop, multi-round authentication engine architecture having a hash engine core with an inner hash engine and an outer hash engine. The architecture is configured to pipeline the hash operations of the inner hash and outer hash engines, collapse and rearrange multi-round logic to reduce rounds of hash operations, and implement multi-round logic to schedule addition computations to be conducted in parallel with round operations. The multi-loop, multi-round authentication algorithm may be HMAC-MD5 or HMAC-SHA1.

In another aspect, the invention pertains to a method of authenticating data transmitted over a computer network. The method involves receiving a data packet stream, splitting the packet data stream into fixed-size data blocks, processing the fixed-size data blocks using a multi-round authentication engine architecture. The architecture implements hash round logic for a multi-round authentication algorithm configured to schedule addition computations to be conducted in parallel with round operations. The multi-round authentication algorithm may be MD5 or SHA1.

In still another aspect, the invention pertains to a method of authenticating data transmitted over a computer network using an SHA1 authentication algorithm. The method involves providing five hash state registers, and providing data paths from the five state registers such that four of the five data paths from the registers in any SHA1 round are not timing critical.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF EMBODIMENTS OF THE INVENTION

Figure 1:
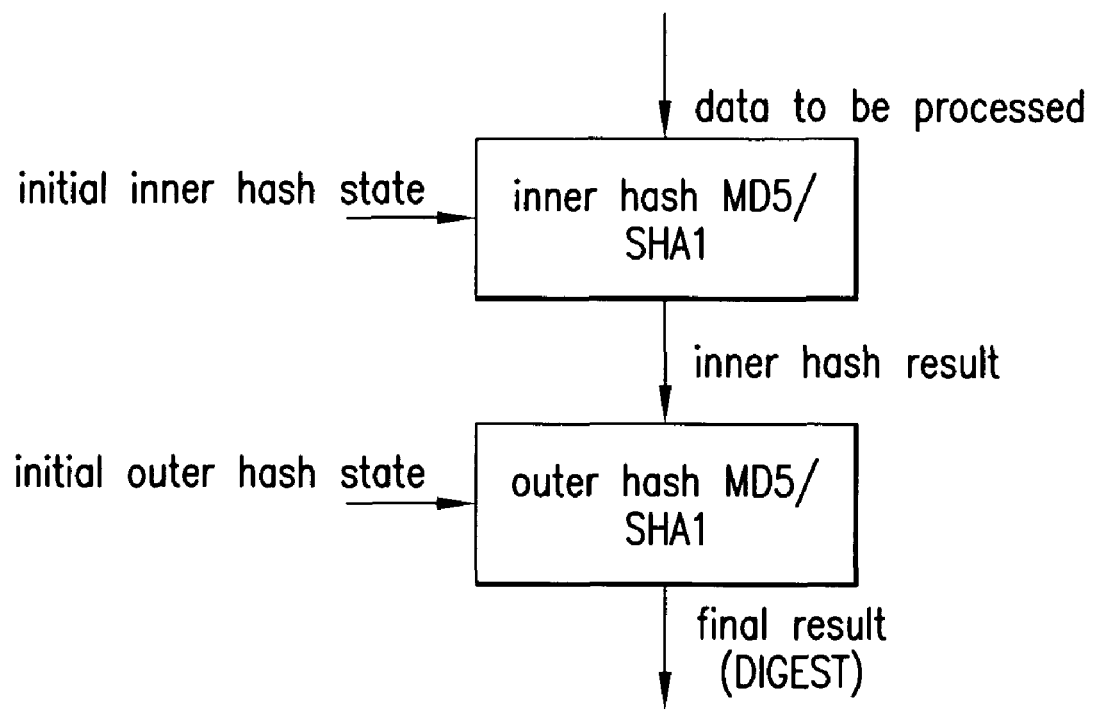
FIG. 1 is a high-level block diagram depicting the HMAC-x algorithm (HMAC for either MD5 or SHA1) implemented in the IPSec standard protocol.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, the present invention provides an architecture (hardware implementation) for an authentication engine to increase the speed at which multi-loop and/or multi-round authentication algorithms may be performed on data packets transmitted over a computer network. Authentication engines in accordance with the present invention apply a variety of techniques that may include, in various applications, collapsing two multi-round authentication algorithm (e.g., SHA1 or MD5 or variants) processing rounds into one; reducing operational overhead by scheduling the additions required by a multi-round authentication algorithm (e.g., SHA1 or variants) in such a matter as to reduce the overall critical timing path ("hiding the adds"); and, for an HMAC (multi loop) variant of a multi-round authentication algorithm, pipelining the inner and outer loops. Among other advantages, an authentication engine in accordance with the present invention provides improved performance with regard to the processing of short data packets.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

The present invention may be implemented in a variety of ways. As described in this application, the invention has particular application to the variants of the SHA1 and MD5 authentication algorithms specified by the IPSec cryptography standard. In the following description, the invention is discussed primarily in connection with the IPSec protocol. However, one of skill in the art will recognize that various aspects of the invention may also be applied to multi-loop and/or multi-round authentication algorithms generally, whether or not used with IPSec or in conjunction with cryptography operations at all. Further, while the aspects of the present invention described below are used together in a preferred embodiment of the invention, some aspects may be used independently to accelerate authentication operations. For example, the pipelining operations are particularly applicable to multi-loop, multi-round authentication algorithms; the round-collapsing operations are particularly applicable to SHA1 and variant authentication algorithms; while the scheduling of the additions may be applied to any multi-round authentication algorithm.

Pipelining Inner and Outer Hash Operations

Figure 2:
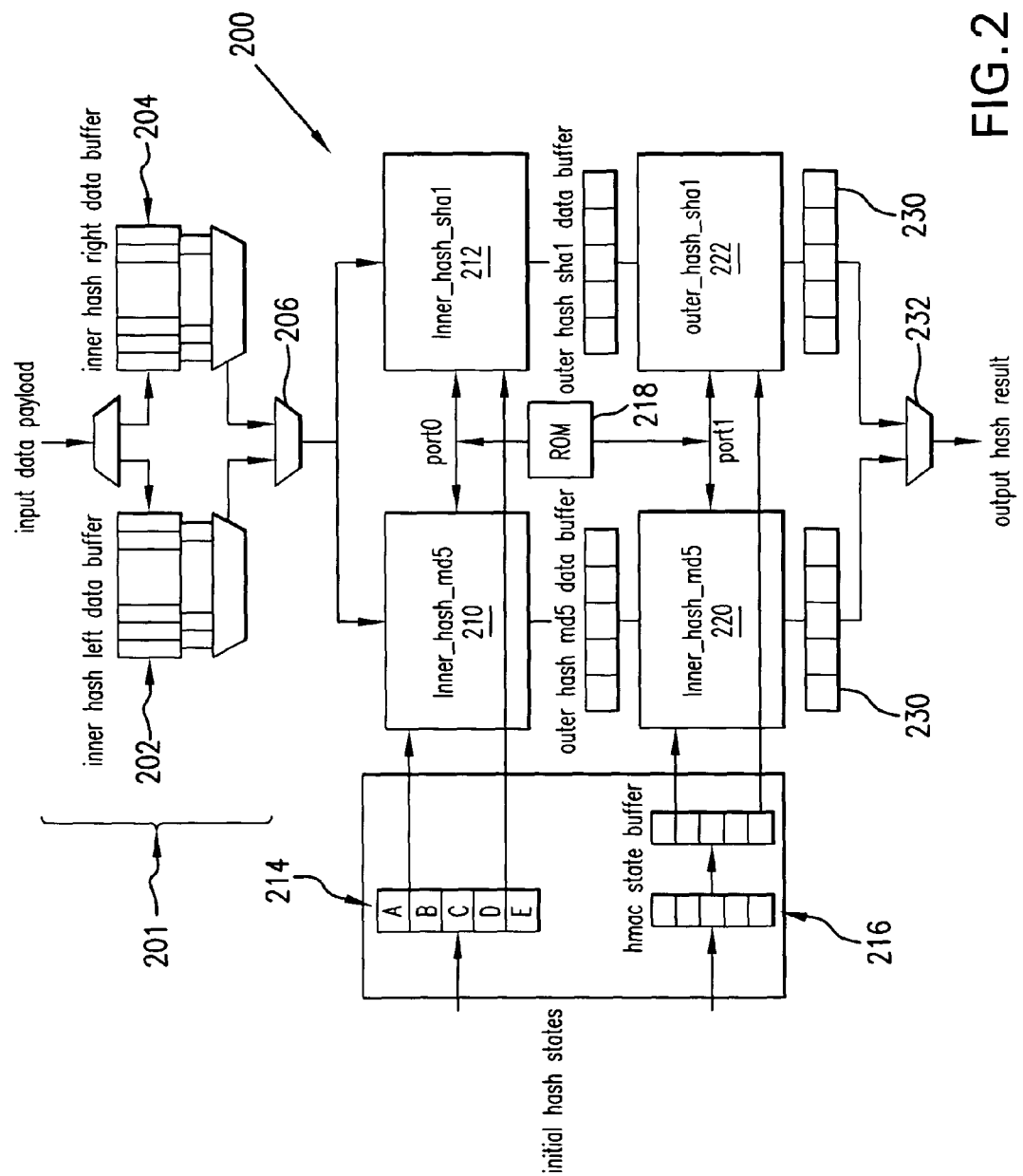
FIG. 2 is a high-level block diagram of an authentication engine architecture in accordance with one embodiment the present invention.

FIG. 2 is a high-level block diagram of an authentication engine architecture in accordance with one embodiment the present invention. The engine architecture implements a pipelined structure to hide the time required for performing the outer hash operation when multiple data payloads are fed to the engine continuously. The engine architecture includes a core having two instantiations of the hash round logic; in this instance, inner and outer hash engines (inner and outer loops) for each of the MD5 hash round logic and the SHA1 hash round logic supported by the IPSec protocol. Pipeline control logic ensures that the outer hash operation for one data payload is performed in parallel with the inner hash operation of the next data payload in the packet stream fed to the authentication engine. A dual-frame input buffer is used for the inner hash engine, allowing one new 512-bit block to be loaded while another one is being processed, and the initial hash states are double buffered for concurrent inner hash and outer hash operations. In addition, dual-ported ROM is used for concurrent constant lookups by both inner and outer hash engines.

Referring to FIG. 2, the engine 200 includes a dual-frame input data payload buffer 201, in this instance having left frame 202, and a right frame 204. Input data payloads received by the engine 200, for example from data packets received off a network by a chip on which the engine architecture is implemented, are distributed between the frames 202, 204 of the input data buffer 201 so that one data block may be loaded into the buffer while another one is being processed downstream in the data flow. Since FIG. 2 illustrates an implementation of the present invention for processing IPSec packets, the architecture includes hash engines for the MD5 and SHA1 authentication protocols supported by IPSec. In accordance with the MD5 and SHA1 protocols, the input data payloads are loaded into the dual frames of the input data buffer 201, split into 512-bit data blocks, padded if necessary (i.e., where the data block is less than 512 bits) and stored prior to being passed to an inner hash engine for processing. A multiplexer 206 controls the flow of 512-bit data blocks from the frames of the input buffer to an inner hash engine.

Initial hash states are needed on per packet basis for the first data block of each packet. Initial hash states, are generated by software based on the authentication key and some default constant states based on the HMAC algorithm (pre-hashed), in accordance the specifications for these algorithms. This is typically done once per key. Alternatively, the initial states may be derived from the default constant states and the authentication key using the same hardware for every packet that requires authentication.

The initial hash states for the inner hash of a given data block are loaded into a buffer 214 associated with the inner hash engine(s) 210, 212. The initial hash states for the outer hash of that data block are loaded into the first 215 of a pair of buffers 215, 216 (referred to as an HMAC state buffer) associated with the outer hash engine(s) 220, 222. When the initial hash states are passed to the inner hash engine for processing of the data block, the outer hash states for that block are loaded into the second buffer 216, and the inner and outer initial hash states for the next packet to be processed are loaded into the buffers 214, 215, respectively. In this way, the synchronization of the inner and outer hash states for a given data block is maintained, and the initial hash states are available for concurrent inner hash and outer hash operations. Further, the double buffering of the hash states allows initial hash states of the second packet to be loaded while the first packet is being processed so that the data processing is continuous from packet to packet, thereby maximizing the efficiency and processing power of the hash engine.

The engine 200, further includes a dual-ported ROM 218. The dual-ported ROM 218 further facilitates the parallel inner and outer has operations by allowing for concurrent constant lookups by both inner and outer hash engines.

The inner hash is conducted on all 512 bit blocks of a given data packet. The result of inner hash is 128 bits long for MD5 and 160 bits long for SHA1. The result is padded up to 512 bits and the outer hash processes the one 512-bit block of data to compute a digest based on the result of the inner hash. An output buffer 230 stores the digest and outputs it through a multiplexer 232.

Collapsing Multi-Round Authentication Algorithm Processing Rounds

Of the two algorithms supported by the IPSEc protocol, HMAC-SHA1-96 is about twenty-five percent slower than HMAC-MD5-96 in terms of the total computation rounds. One way to improve HMAC-SHA1-96 in an IPSec-supporting hardware implementation is to collapse multiple rounds of logic into single clock cycle thus the total number of clocks required for HMAC-SHA1-96 operation is reduced. The same approach may be applied to any multi-round authentication algorithm. However, simply collapsing the logic for multiple rounds into a single clock cycle can cause the delay to compute the collapsed logic to increase, therefore reducing the maximum clock frequency.

Figure 3:
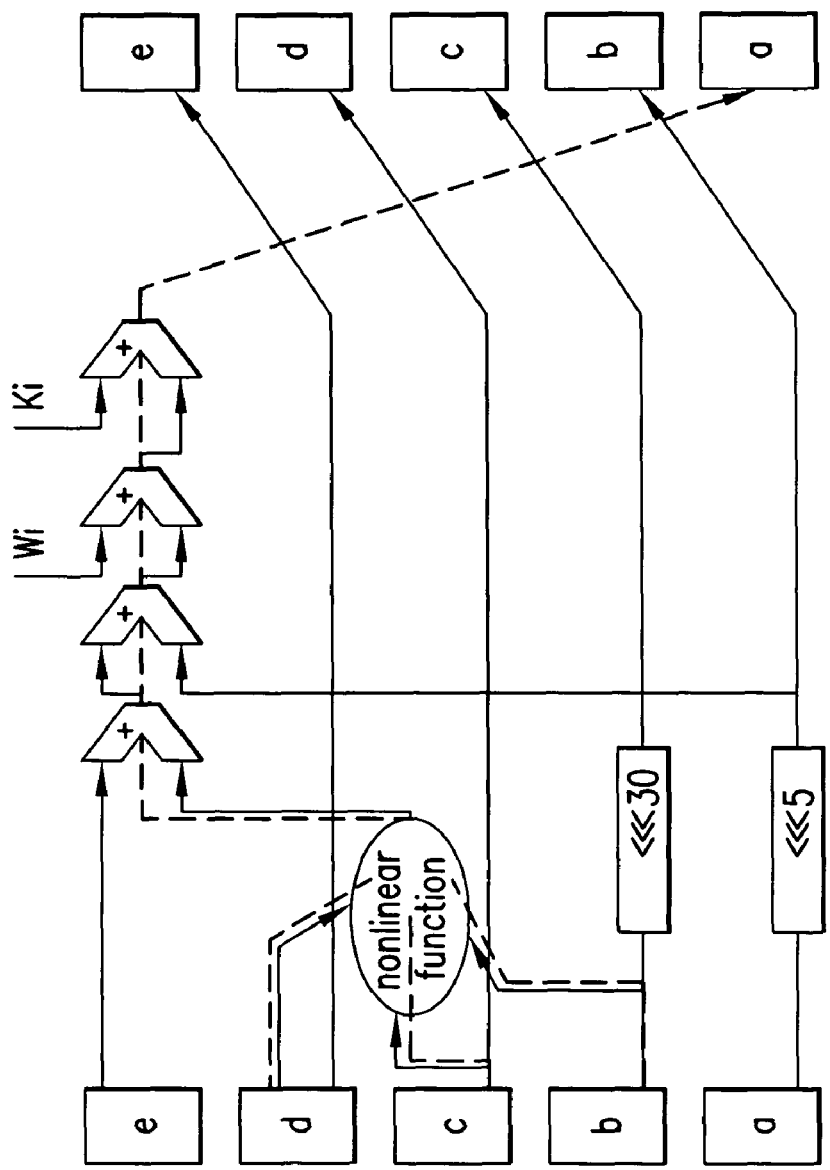
FIG. 3 is a time study diagram illustrating the critical path of the conventional round logic of the SHA1 authentication algorithm.

FIG. 3 is a time study diagram illustrating the timing critical path of the conventional round logic of the SHA1 authentication algorithm. Registers a, b, c, d and e hold the intermediate hash states between rounds. They are duplicated in this figure to demonstrate the ending points of the logic paths clearly. In the actual design, the paths are fed back to the same set of registers because the round logic is reused 80 times. The "+" symbols identify standard adders implemented as carry look-ahead adders (CLAs). $W_i$ represents the incoming payload. $K_i$ represents a constant, obtained from ROM used in the authentication computations. It is shown in the figure that the timing critical paths are from registers b, c and d, going through the non-linear function (defined by the SHA1 specification) and the adders and ending at register a. Registers b, c, d and e each receives a non-critical input (b receives a, etc.).

Figure 4:
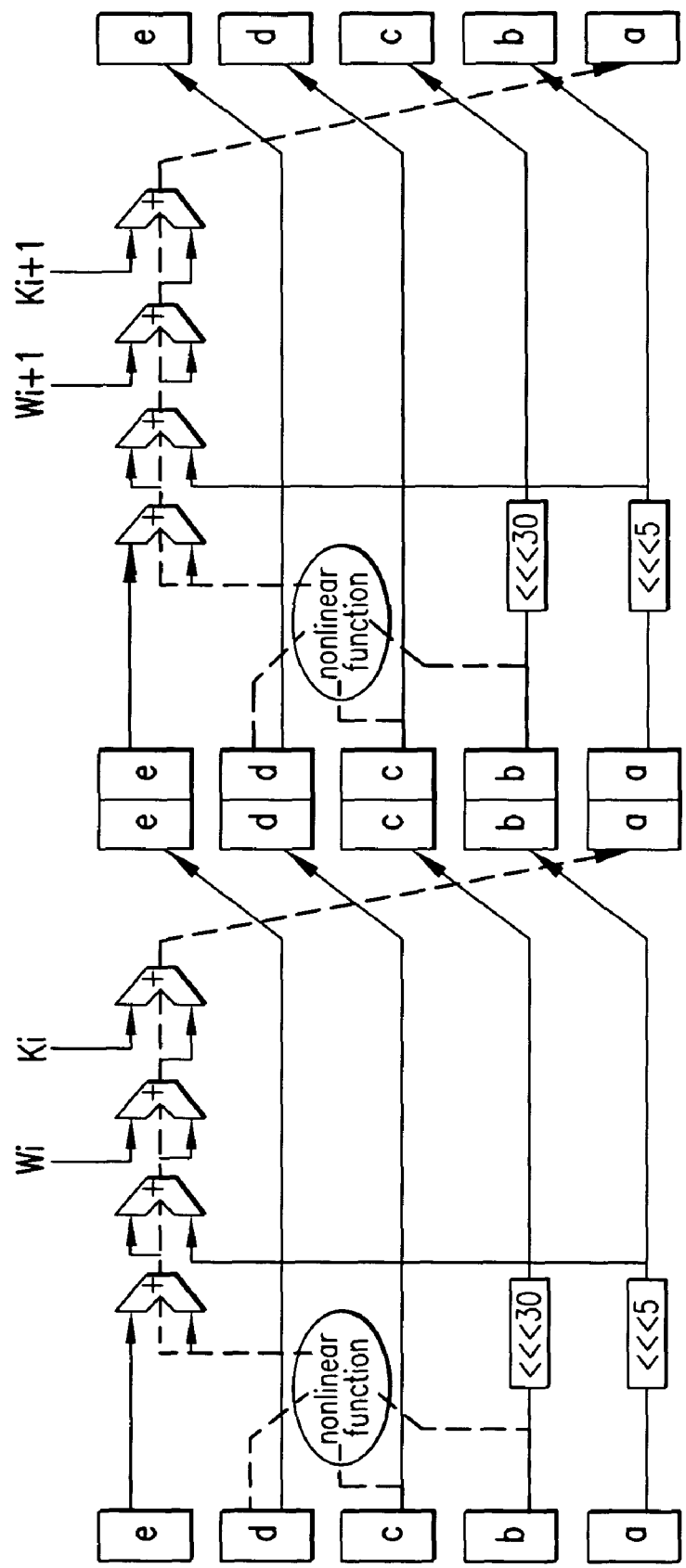
FIG. 4 is a time study diagram illustrating the critical path of the round logic of the SHA1 authentication algorithm in accordance with one embodiment the present invention.

FIG. 4 is a time study diagram illustrating the timing critical path of the collapsed round logic of the SHA1 authentication algorithm in accordance with one embodiment the present invention. The SHA1 algorithm specifies five registers. As illustrated above, the data path of four of the five registers in any SHA1 round are not critical (time limiting). In accordance with this invention, in successive SHA1 rounds the registers having the critical path are alternative so that four registers worth of data may always be passed on to the next round prior to completion of the critical path in the current round. Thus, when two rounds of SHA1 are put together, the critical path computation of the second round is independent of that of the first round, since the receiving register of the critical path of the first round (i.e., register a) is not the driving register of the critical path of the second round (i.e., register e). This approach demonstrates how two SHA1 rounds may be collapsed together while maintaining the same amount of delay for the timing critical path, and how by alternating the critical path from register to register between rounds in this way, the adding operations may be "hidden."

In a preferred embodiment, the eighty rounds of an SHA1 loop are collapsed into forty rounds. As described and illustrated above, the collapsing of rounds is accomplished by having a single set of registers (the preferred embodiment has 5 registers as defined by the IPSec protocol) with two rounds of logic. It is contemplated that the techniques of invention described herein can also be applied to further collapse the number of SHA1 rounds in an SHA1 loop into twenty or even fewer rounds.

Scheduling the Additions

As described above, both MD5 and SHA1 algorithms specify that the final hash states of every 512-bit block to be added together with the initial hash states. The results are then used as the initial states of the next 512-bit block. In MD5, values of four pairs of 32-bit registers need to be added and in SHA1, five pairs. Considering that each 32-bit addition takes one clock cycle, a typical hardware implementation would use four extra cycles in MD5 and five extra cycles in SHA1 to perform these additions if hardware resources are limited.

As noted above with reference to FIGS. 3 and 4, in both MD5 and SHA1, only one state register is re-computed every round. The rest of the state registers use shifted or non-shifted contents from neighboring registers. Thus, the final hash states are not generated in the final round, but rather in the last four consecutive MD5 rounds or five SHA1 rounds, respectively. The present invention exploits this observation by providing architecture and logic enabling the scheduling of the additions as early as the final hash state is available, hiding the computation time completely behind the round operations. This is illustrated in the following scheduling tables in which 'Ti' represents one clock cycle and 'md i' represents round operation. The initial hash states are represented by ia, ib, ic, id and ie. Parallel operations are listed in the same column.

| MD5 | | | | | | | | |
|-----|-----|-----|-----|-----|-----|-----|-----|-----|
| T1 | T2 | T3 | --- | T61 | T62 | T63 | T64 | T1 |
| rnd 1 | rnd 2 | rnd 3 | | rnd 61 | rnd 62 | rnd 63 | rnd 64 | rnd 1 |
| | | | | | a + ia | d + id | c + ic | b + ib |

| original SHA1 | | | | | | | | |
|-----|-----|-----|-----|-----|-----|-----|-----|-----|
| T1 | T2 | T3 | --- | T77 | T78 | T79 | T80 | T1 |
| rnd 1 | rnd 2 | rnd 3 | | rnd 77 | rnd 78 | rnd 79 | rnd 80 | rnd 1 |
| | | | | e + ie | d + id | c + ic | b + ib | a + ia |

| collapsed SHA1 | | | | | | |
|-----|-----|-----|-----|-----|-----|-----|
| T1 | T2 | T3 | --- | T38 | T39 | T40 | T1 |
| rnd 1 | rnd 2 | rnd 3 | | rnd 38 | rnd 39 | rnd 40 | rnd 1 |

-continued

| | | | collapsed SHA1 | | | |
|---|---|---|---|---|---|---|
| T1 | T2 | T3 | - - - T38 | T39 | T40 | T1 |
| | | | | e + ie | d + id | b + ib |
| | | | | | c + ic | a + ia |

In one embodiment of the invention, a plurality of adds with the final hash states may be accomplished in a single clock cycle. An example is shown in the "collapsed SHA1" table, in which the five adds are performed in just three clock cycles T39, T40 and T1 of the next loop. One of skill in the art will recognize that, consistent with the principles of this invention described herein, it is possible to perform more than two adds in parallel in one clock cycle. Moreover, it should be noted that, as illustrated in the tables, this aspect of the present invention is applicable to both collapsed and non-collapsed multi-round authentication algorithms. Implementation of this aspect of the present invention in conjunction with a collapsed multi-round algorithm is particularly advantageous since hiding of adding steps becomes increasingly important as the number of rounds is decreased. Adds that are not hidden in the manner of this. aspect of the present invention would represent an even larger proportion of overhead in a collapsed round implementation than in an implementation with a higher number of rounds.

Logic Design

Figure 5:
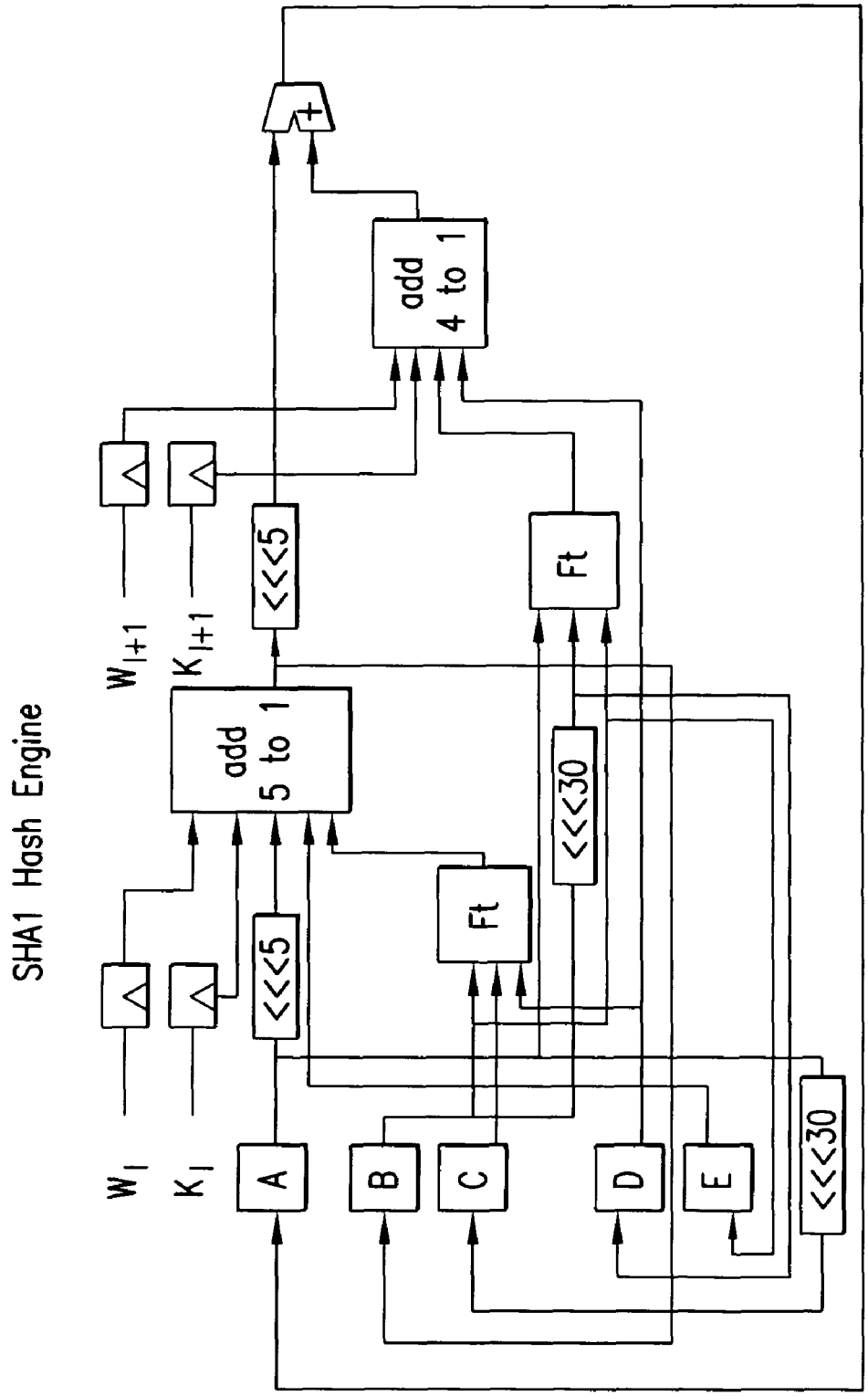
FIG. 5 is a high-level block diagram of an SHA1 hash engine illustrating the major elements of a round logic design in accordance with one embodiment the present invention.

FIG. 5 is a high-level block diagram of an SHA1 hash engine illustrating the major elements of a collapsed round logic design in accordance with one embodiment the present invention consistent with the timing critical path study of FIG. 4. The design makes use of carry save adders (CSA; delay is equivalent to 1-bit adder), taking advantage of their capacity to add multiple quantities together. CSAs efficiently add multiple quantities together to generate partial products which are not propagated. Two comprehensive addition modules, add5to1 and add4to1 in the figure each uses several stages of CSA followed-by a carry look-ahead (CLA) adder, as illustrated and described in more detail with reference to FIG. 6, below.

The hash engine has five registers, A, B, C, D and E. The initial hash state in register A ($a_1$) goes through a 5-bit circular shift and is added to the initial hash state in register E ($e_1$), the payload data ($W_i$), a constant ($K_i$), and the result of a function ($F_t$) of the initial hash states in registers B, C and D by an add5to1 adder module that is built by CSA and CLA adders. The initial hash state in register D ($d_1$) is added to the payload data ($W_{i+1}$), a constant ($K_{i+1}$), and the result of a function ($F_t$) of the initial hash states in registers A, B (which passes through a 30-bit circular shift) and C by an add4to1 adder module that is built by CSA and CLA adders.

The adder modules conclude with a carry look-ahead (CLA) adder. The sum of each adder module is added by a CLA adder to generate and propagate a final sum for the round which is then fed back into register A for the next round. The most timing critical input of these two modules needs only to go through the last CLA stage.

Figure 6:
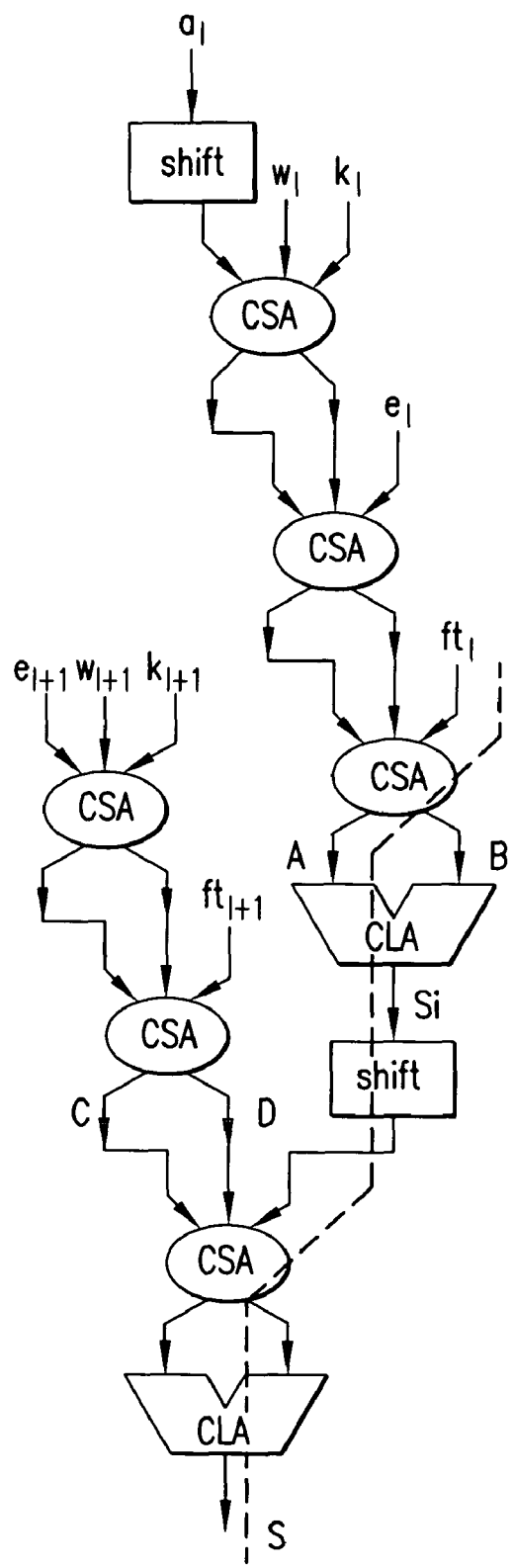
FIG. 6 is a lower-level block diagram illustrating details of the scheduling of the additions within the round logic design of FIG. 5.

FIG. 6 is a lower-level block diagram illustrating details of the scheduling of the additions within the round logic design of FIG. 5. Unrolling two rounds of SHA1 operation will lead to a speed path of:

$$S=((a<<<5)+f(b, c, d)+e+w+k)<<<5+f(b, c, d)+e+w+k,$$

where, a, b, c, d, e, w and k are 32-bit quantities. In accordance with the embodiment of the present invention depicted in FIG. 5, the operation is done in two steps. Step 1 uses module add5to1 to generate:

$$Si=(a<<<5)+f(b, c, d)+e+w+k.$$

Step 2 uses module add4to1 and a 32-bit carry look-ahead adder (CLA) to generate:

$$S=Si<<<5+f(b, c, d)+e+w+k.$$

In each step, carry save adders (CSA) are used to perform 3-2 input reduction before the 32-bit CLA is applied. The overall delay is equivalent to two 32-bit CLA delays plus one 32-bit CSA delay plus the delay for function 'f' for the most timing critical path. After all the reductions are completed via CSAs, Step 1 and Step 2 become:

$$S=(A+B)<<<5+C+D.$$

Implementations of the invention using this logic design in an authentication engine using the HMAC-SHA1 algorithm of the IPSec protocol, collapsing of the conventional 80 SHA1 rounds into 40 rounds, hiding the adds, and pipelining the inner and outer loops have enabled HMAC-SHA1 to be conducted in approximately the same time as conventional SHA1.

Conclusion

Although the foregoing invention has been described in some detail for purposes of clarity of understanding, those skilled in the art will appreciate that various adaptations and modifications of the just-described preferred embodiments can be configured without departing from the scope and spirit of the invention. For example, while the present invention has been described primarily in connection with the IPSec protocol, the principles of the invention may also be applied to multi-round authentication algorithms generally, whether or not used in conjunction with cryptography operations. Therefore, the described embodiments should be taken as illustrative and not restrictive, and the invention should not be limited to the details given herein but should be defined by the following claims and their full scope of equivalents.

What is claimed is:

1. An authentication engine comprising:
    an inner hash engine configured to perform a multi-round authentication algorithm, wherein the multi-round authentication algorithm includes a plurality of sequential operations, the inner hash engine including:
        a first N to 1 hardware adder module, and
        a second N to 1 hardware adder module coupled to receive an output from the first N to 1 hardware adder module,
    wherein the first N to 1 hardware adder module and the second N to 1 hardware adder module are arranged to collapse two consecutive operations in the plurality of sequential operations into a single operation;
    an outer hash engine configured to perform, in hardware, an authentication algorithm on an output from the inner hash engine; and
    memory configured to perform lookups for both the inner and outer hash engines.

2. The authentication engine of claim 1, wherein the multi-round authentication algorithm is a hash algorithm.

3. The authentication engine of claim 2, wherein the multi-round authentication algorithm is MD5.

4. The authentication engine of claim 2, wherein the multi-round authentication algorithm is the Secure Hash Algorithm (SHA).

5. The authentication engine of claim 1, wherein the authentication algorithm performed by the outer hash engine is the Secure Hash Algorithm (SHA).

6. The authentication engine of claim 1, wherein the first N to 1 hardware adder module includes:
   a plurality of hardware carry save adders; and
   a hardware carry look-ahead adder coupled to a hardware carry save adder in the plurality of hardware carry save adders.

7. The authentication engine of claim 6, wherein the second N to 1 hardware adder module includes:
   a plurality of hardware carry save adders; and
   a hardware carry look-ahead adder coupled to a hardware carry save adder in the plurality of hardware carry save adders.

8. The authentication engine of claim 7, wherein a hardware carry save adder in the first N to 1 hardware adder receives a first non-liner function as input.

9. The authentication engine of claim 7, wherein a hardware carry save adder in the second N to 1 hardware adder receives a second non-liner function as input.

10. The authentication engine of claim 1, wherein the first N to 1 hardware adder receives a first non-liner function as input and the second N to 1 hardware adder receives a second non-liner function as input.

11. The authentication engine of claim 1, wherein the inner hash engine further comprises:
   a first hardware circular shifter coupled to the input of the first N to 1 adder; and
   a second hardware circular shifter coupled to the output of the first N to 1 adder.

12. An authentication engine, comprising:
   an inner hash engine configured to perform a modified Secure Hash Algorithm having a plurality of sequential operations, the inner hash engine including:
      a first hardware adder module including a first cascade of carry save adders and a first carry look-ahead adder coupled to a last carry save adder in the first cascade of carry save adders, and
      a second hardware adder module including a second cascade of carry save adders and a second carry look-ahead adder coupled to a last carry save adder in the second cascade of carry save adders,
   wherein the first hardware adder module and the second hardware adder module are arranged to collapse two consecutive operations of an unmodified Secure Hash Algorithm into a single operation in the modified Secure Hash Algorithm, and
   wherein the first carry look-ahead adder, the last carry save adder in the first cascade of carry save adders, the second carry look-ahead adder, and the last carry save adder in the second cascade of carry save adders are in a timing critical path; and
   an outer hash engine configured to perform an authentication algorithm on an output from the inner hash engine.

13. The authentication engine of claim 12, wherein the last carry save adder in the first cascade of carry save adders is configured to receive a first non-linear function as input.

14. The authentication engine of claim 13, wherein the first non-liner function receives a first value for a first variable, a first value for a second variable and a first value for a third variable as input.

15. The authentication engine of claim 14, wherein the second non-liner function receives a second value for the first variable, a second value for the second variable and a second value for the third variable as input.

16. The authentication engine of claim 12, wherein the last carry save adder in the second cascade of carry save adders is configured to receive a second non-linear function as input.

17. The authentication engine of claim 12, wherein the first hardware adder module receives a first value for a fourth variable and a first value for a first constant as inputs.

18. The authentication engine of claim 17, wherein the second hardware adder module receives a second value for the fourth variable and a second value for the first constant as inputs.

19. The authentication engine of claim 18, wherein the value of the first constant is dependent upon the position of the operation in the plurality of sequential operations being performed by the inner hash engine.

* * * * *